(12) United States Patent
Le Chaffotec et al.

(10) Patent No.: US 11,370,460 B2
(45) Date of Patent: Jun. 28, 2022

(54) METHOD FOR ASSISTING IN THE DRIVING OF A VEHICLE WHEN THERE IS A NETWORK FAILURE AND ASSOCIATED SYSTEM

(71) Applicant: PSA AUTOMOBILES SA, Poissy (FR)

(72) Inventors: Alban Le Chaffotec, Le Plessis Bouchard (FR); Laurent Legras, Jouy en Josas (FR); Xavier Oudin, Denney (FR); Barbara Cervelle, Nanterre (FR)

(73) Assignee: PSA AUTOMOBILES SA, Poissy (FR)

( * ) Notice: Subject to any disclaimer, the term of this patent is extended or adjusted under 35 U.S.C. 154(b) by 162 days.

(21) Appl. No.: 16/644,447

(22) PCT Filed: Sep. 10, 2018

(86) PCT No.: PCT/FR2018/052205
§ 371 (c)(1),
(2) Date: Mar. 4, 2020

(87) PCT Pub. No.: WO2019/063899
PCT Pub. Date: Apr. 4, 2019

(65) Prior Publication Data
US 2020/0223453 A1     Jul. 16, 2020

(30) Foreign Application Priority Data

Sep. 29, 2017   (FR) ...................................... 1759050

(51) Int. Cl.
*B60W 60/00*   (2020.01)
*B60W 30/12*   (2020.01)
(Continued)

(52) U.S. Cl.
CPC ........ *B60W 60/0057* (2020.02); *B60W 30/12* (2013.01); *B60W 30/14* (2013.01); *B60W 50/14* (2013.01); *B60W 30/16* (2013.01)

(58) Field of Classification Search
CPC ..... H04L 45/28; H04L 41/0654; H04L 69/40; H04L 12/66; B60W 60/0057;
(Continued)

(56) References Cited

U.S. PATENT DOCUMENTS

2004/0128673 A1 *  7/2004  Fuchs ..................... H04L 43/10
                                                        719/310
2012/0265379 A1 * 10/2012  Chen ................... B61L 15/0036
                                                         701/20
(Continued)

FOREIGN PATENT DOCUMENTS

DE     102015108286 A1    12/2015
DE     102015110958 A1    1/2016
(Continued)

OTHER PUBLICATIONS

International Search Report for PCT/FR2018/052205 dated Nov. 14, 2018.
(Continued)

*Primary Examiner* — Abby Y Lin
*Assistant Examiner* — Dylan M Katz
(74) *Attorney, Agent, or Firm* — Sandberg Phoenix & von Gontard PC

(57) ABSTRACT

A method for assisting in the driving of a vehicle comprises receiving and processing data originating from an actuation module via the first network and in response to the detection of a failure in the first network, further comprising steps of: triggering a phase of manual control recovery by a driver of the vehicle, and receiving and processing the data originating from the actuation module via a second network.

9 Claims, 3 Drawing Sheets

(51) Int. Cl.
  *B60W 30/14* (2006.01)
  *B60W 50/14* (2020.01)
  *B60W 30/16* (2020.01)

(58) Field of Classification Search
  CPC ...... B60W 30/12; B60W 30/14; B60W 50/14; B60W 2050/0292; B60W 2050/0297; B60W 2050/143; B60W 50/082; B60W 30/16; B60W 50/023; B60W 50/02; B60W 50/0225; B60W 2050/0215; B60W 60/0059; B60W 60/0061; B60W 60/005; B60W 60/0053; H04B 1/74; G06F 11/2005
  See application file for complete search history.

(56) References Cited

U.S. PATENT DOCUMENTS

| | | | |
|---|---|---|---|
| 2013/0096767 A1 | 4/2013 | Rentschler et al. | |
| 2017/0072967 A1* | 3/2017 | Fendt | B60W 10/18 |
| 2017/0288951 A1* | 10/2017 | Kurauchi | H04L 43/0811 |
| 2018/0026708 A1* | 1/2018 | Priest | H04W 4/40 370/316 |
| 2018/0267535 A1* | 9/2018 | Robert | G05D 1/0257 |
| 2019/0047581 A1* | 2/2019 | Bai | B60W 50/06 |
| 2019/0084425 A1* | 3/2019 | Liu | B60L 3/12 |
| 2019/0356574 A1* | 11/2019 | Schoch | H04L 63/105 |

FOREIGN PATENT DOCUMENTS

| | | |
|---|---|---|
| DE | 102015210531 A1 | 12/2016 |
| FR | 2995161 A1 | 3/2014 |
| FR | 3031406 A1 | 7/2016 |

OTHER PUBLICATIONS

Written Opinion for PCT/FR2018/052205 dated Nov. 14, 2018.
Buja et al.; "Overcoming Babbling-Idiot Failures in the Flexcan Architecture: A Simple Bus-Guardian", 10th IEEE International Conference on Emergiging Technologies and Factory Automation, Sep. 22, 2005 (8 Pages).

* cited by examiner

METHOD FOR ASSISTING IN THE DRIVING OF A VEHICLE WHEN THERE IS A NETWORK FAILURE AND ASSOCIATED SYSTEM

CROSS-REFERENCE TO RELATED APPLICATIONS

This application is the US National Stage under 35 USC § 371 of International Application No. PCT/FR2018/052205, filed 10 Sep. 2018 which claims priority to French Application No. 1759050 filed 29 Sep. 2017, both of which are incorporated herein by reference.

BACKGROUND

The present invention relates to the field of driver-assistance systems for motor vehicles.

Driver-assistance systems are presently widespread in recent motor vehicles and are undergoing rapid development.

Adaptive speed regulators, better known as ACCs (for "adaptive cruise control" or "autonomous cruise control"), are known, for example. This type of assistance mode automatically adjusts the speed so as to keep a constant safety distance from the vehicle in front of the user on the basis of information collected on this vehicle (in particular the distance and the speed of approach) using one or more radar, lidar or infrared sensors.

Dynamic systems preventing unintentional lane-switching are also known, in particular from US 2013/0096767. Said systems, generally known by the acronyms ALKA (for "active lane-keep assist"), LKAS (for "lane-keep assistance system"), ALA (for "active lane assist") or ALC (for "active lane control"), detect marking lines on the surface using optical sensors and/or cameras and dynamically intervene with the vehicle when it deviates from its traffic lane. In a specific situation of this type, the driver-assistance system will thus automatically correct the direction of the vehicle and/or activate braking.

The aforementioned driver-assistance modes are each activatable independently using a dedicated control button, located for example on the steering wheel, on a control arm below the steering wheel, or even on the vehicle dashboard.

Recently, new driver-assistance systems have started to appear in high-end motor vehicles.

This is in particular the case for traffic jam driver assistants (better known by the acronym TJC for "traffic jam chauffeur"), which are intended to support the driver in heavy traffic or traffic jam situations (speed below 50/70 km/h) on divided highways (motorways and expressways). They are capable of automatically regulating the speed until stopping so as to keep a desired distance from the vehicle in front while providing control of the direction of travel, in such a way that the driver can release the steering wheel and the pedals so as to engage in other activities.

The autonomous operation of a motor vehicle is regulated by standards intended in particular to place a minimum safety level on the functions of the vehicle. The safety levels are referred to as ASIL, for Automotive Safety Integrity Level. The safety levels are in particular ASIL A, ASIL B, ASIL C, ASIL D in increasing order of safety.

The safety level is based on various elements, such as the occurrence of a dangerous situation, its frequency, the results of damage associated with such a situation, the capacity for managing the dangerous situation, etc. In addition, the higher a safety level a function has, for example an ASIL D level, the more complex and expensive the function will be to implement so as to minimize the risks associated with use of the function. In general, autonomous operation of a vehicle typically requires an ASIL D safety level to guarantee maximum safety of the vehicle occupants in the face of dangerous situations.

Thus, a system of this type has to be capable of continuing to operate in the event of a failure, in particular a failure in the communication network between fixtures, until the driver recovers manual control of the vehicle or until the vehicle is brought to safety.

A method for detecting a transmission error in a motor vehicle is known from DE102015210531. This method makes it possible to detect "babbling idiot" failures. However, there is no provision for maintaining the operation of the vehicle during a failure of this type, in particular if this vehicle implements (or is operating in) an autonomous assistance mode.

SUMMARY

Therefore, the object is to overcome the aforementioned problem by proposing a method and device for assisting in driving which allow safe manual control recovery of a vehicle when a network error, in particular of the "babbling idiot" type, has been detected.

More specifically, for this purpose a method and device are proposed for assisting in the driving of a vehicle comprising at least one assistance mode, the method being implemented by a control unit (30) of a driver-assistance system, the control unit (30) being connected to an actuation module (40) comprising a plurality of actuators capable of controlling members of the vehicle via a first network (101) and a second network (102), the method comprising a step of:

Receiving (300) and processing data originating from an actuation module via the first network (101), And, in response to the detection (301) of a failure in the first network (101), the method comprises steps of:

Triggering (302) a phase of manual control recovery by the driver of the vehicle, Transmitting (303) a command to the actuation module (40) instructing that commands originating from the second network (102) are to be taken into consideration, Receiving (304) and processing the data originating from the actuation module via the second network (102).

The use of a second network provides redundancy for the first network, making it possible, in the event of a failure in the first network, to allow time for the driver to recover manual control of his vehicle. The control module and the actuation module continue to communicate via the second network, and ignore the data circulating on the first network since these data are potentially altered by the failure.

According to one feature, the detected failure is of the "babbling idiot" type, where a computer connected to the first network is emitting data onto the first network arbitrarily, disturbing or even blocking operation thereof. The driving assistance system makes it possible for the vehicle to continue to operate autonomously during the phase of manual control recovery, even if one of the networks exhibits a "babbling idiot" failure.

According to one feature, the actuation module comprises a plurality of actuators capable of controlling at least one of direction, acceleration and braking of the vehicle.

Advantageously, the method further comprises, in response to detection of a failure on the second network, a step of triggering a phase of manual control recovery of the vehicle by the driver. Even when it is the second network that is affected by a failure, and the vehicle is therefore still operating flawlessly in the nominal mode, the phase of manual control recovery is still triggered because redundancy is no longer correctly being provided.

Advantageously, the driver-assistance mode provides control of both the lateral and longitudinal movement of the vehicle.

Advantageously, the duration of the phase of manual control recovery is between 5 and 10 seconds.

Advantageously, the first network comprises a first gateway, the actuation module being linked to the first gateway via a first link, the first gateway being linked to the control module via a second link.

Advantageously, the second network comprises a second gateway, the actuation module being linked to the second gateway via a third link, the second gateway being linked to the control module via a fourth link.

A system for assisting in the driving of a vehicle is also disclosed, the system comprising at least one assistance mode, a control unit connected to an actuation module comprising a plurality of actuators capable of controlling components of the vehicle, via a first network and a second network, the system comprising:
  Means for receiving and processing the data originating from the actuation module via the first network,
  the system further comprises means configured for, in response to the detection of a failure in the first network:
  Triggering a phase of manual control recovery by the driver of the vehicle,
  Receiving and processing the data originating from the actuation module via the second network.

Lastly, a vehicle is disclosed which comprises a driving assistance system as described above.

DESCRIPTION OF THE FIGURES

Further features and advantages of the invention will become apparent upon examining the following detailed description and the accompanying drawings, in which.

The accompanying drawings serve to complement the claimed invention, and also help in defining it.

DETAILED DESCRIPTION

The vehicle implements at least one assistance mode, for example for driving in a traffic jam, providing control of both the lateral and longitudinal movement of the vehicle in heavy traffic or traffic jam situations (speed below a predetermined threshold value, for example between 50 and 70 km/h) and on divided highways, and in which the driver is not required to keep his eyes fixed on the road and can engage in other activities because the steering can be maintained for a period of a few seconds (for example between 5 and 10 sec.) before the driver recovers manual control of the vehicle.

Figure 1:
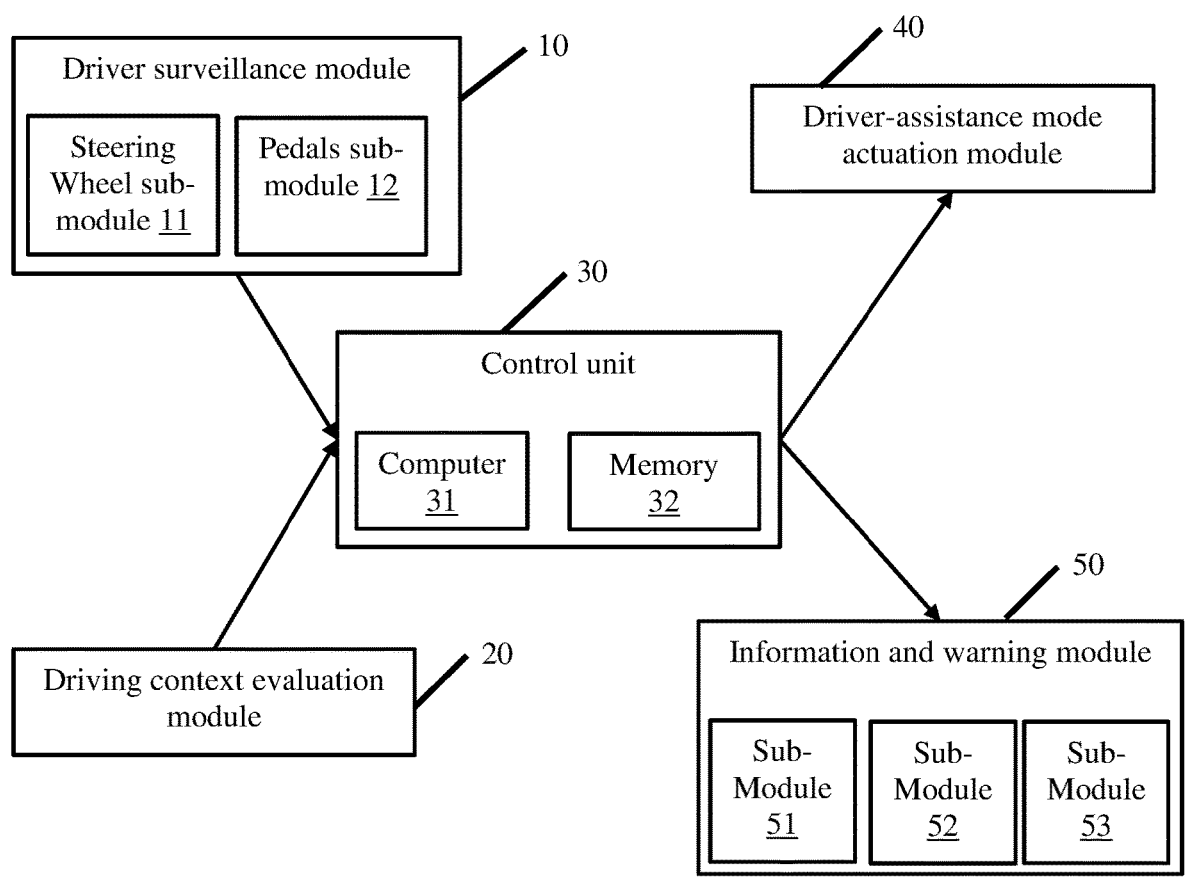
FIG. 1 is a functional diagram of an automated driver-assistance system for a vehicle.

Referring to FIG. 1, the automated driver-assistance system comprises a driver surveillance module 10, a driving context evaluation module 20, a control unit 30, a driver-assistance mode actuation module 40 and an information and warning module 50.

The driver surveillance module 10 comprises for example a sub-module 11 for detecting the presence of the driver's hands on the steering wheel 10 and a sub-module 12 for detecting the presence of his feet on the accelerator, brake and clutch pedals. The driver surveillance module 10 may also comprise a camera pointing toward the driver's face so as to determine his attention level and/or the direction he is looking.

The driving context evaluation module 20 comprises a plurality of sensors, for example a camera that is oriented toward the front of the vehicle and that supplies data for determining the type of road being traversed (highway, fast lane or minor road) from particular characteristic parameters such as the width of the road, the marking on the road surface (color, width and spacing of the lines) and the potential presence of a barrier or median strip separating the two traffic directions. Analysis of the data provided by these sensors further makes it possible to establish the smoothness of the flow of road traffic.

The module 20 further comprises a plurality of sensors measuring particular internal driving parameters such as the instantaneous speed of the vehicle and the steering angle of the steering wheel.

The data collected by the two modules, the driver surveillance module 10 and driving context evaluation module 20, are channeled in real time to the control unit 30 to which the two modules are linked.

The control unit 30 comprises a computer 31 and a storage module 32 comprising EEPROM or FLASH non-volatile memory and RAM.

Figure 3:
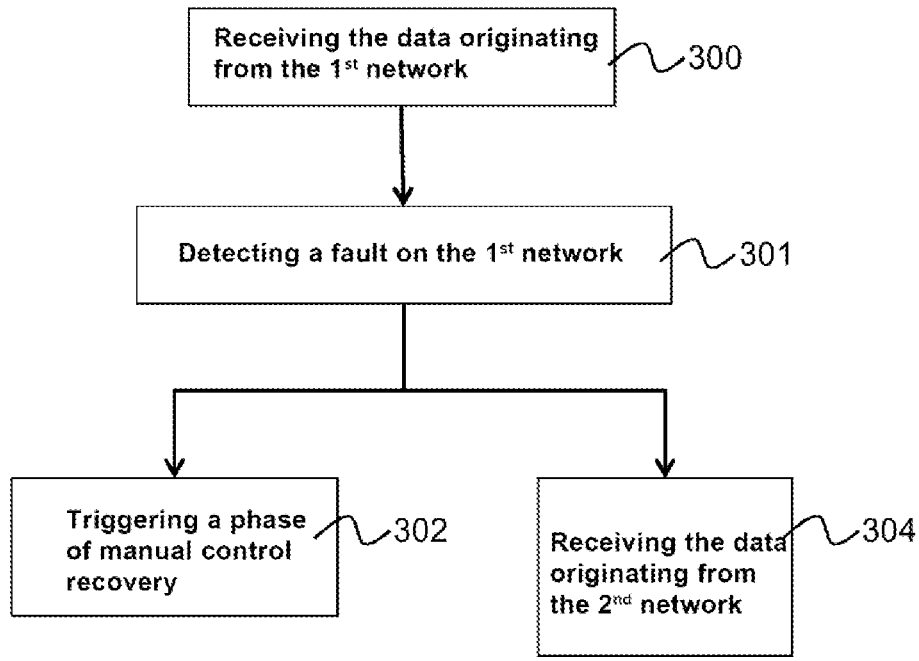
FIG. 3 is a diagram illustrating the method.

The non-volatile memory stores a process for assisting in the driving of the motor vehicle, the flow chart for which is shown in FIG. 3.

All of the information contained in this non-volatile memory can be updated by communication means or means for reading a data carrier.

The control unit 30 is linked to the actuation module 40, to which it is capable of transmitting the command to activate or deactivate one of the driver-assistance modes.

The actuation module 40 comprises a plurality of actuators capable of controlling particular components of the vehicle, such as the direction, acceleration, braking and the gearbox, to provide implementation of the various driver-assistance modes with which the vehicle is provided.

Figure 2:
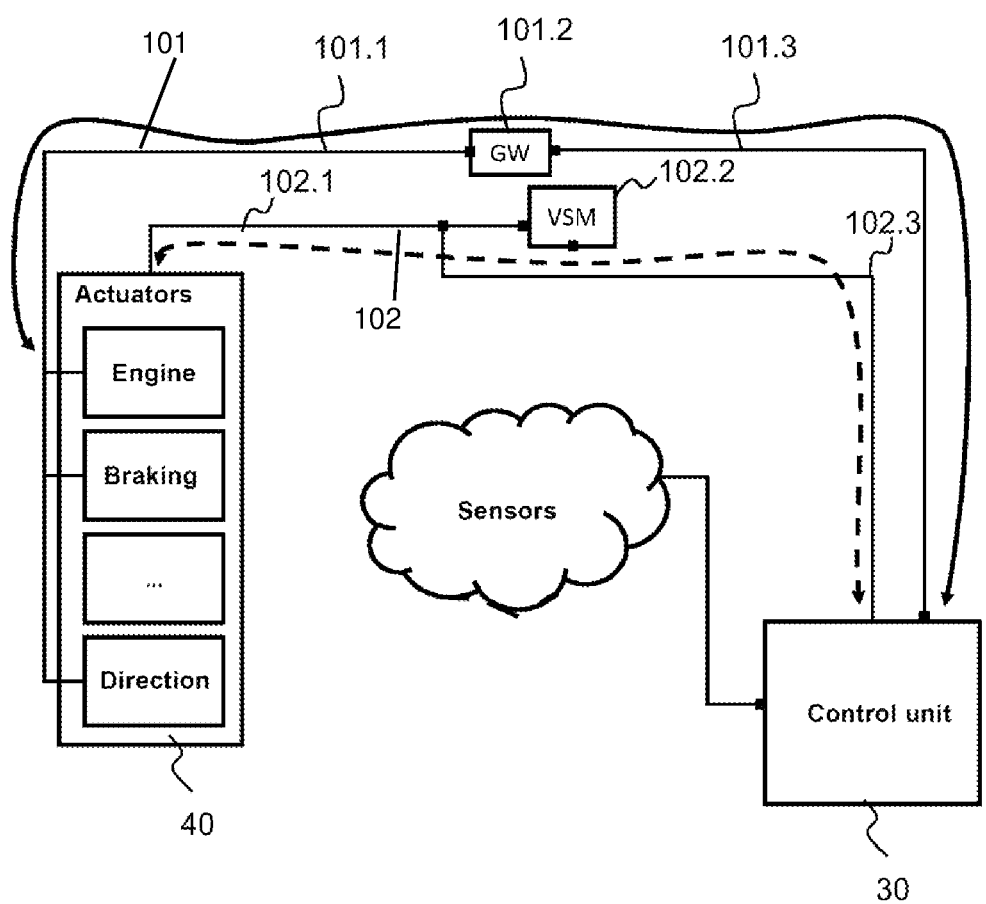
FIG. 2 shows an example embodiment of a system.

FIG. 2 is a schematic representation of a driving assistance system of the vehicle. The driving assistance system comprises a first and a second network.

The control unit 30 is linked to the actuation module 40 via a first network, known as the nominal network, and via a second network, known as the backup network. The control unit 30 is further linked to the driving context evaluation module 20, which comprises a plurality of sensors.

Various types of networks may be used to connect the actuation module 40 to the control module. These include, by way of non-limiting example:
  CAN HS: standard network used by all car manufacturers. This network is formed with a pair of unshielded stranded wires, and is used primarily to transmit parameters having frequencies of up to 10 ms of 8 bytes per frame.
  CAN FD (for flexible data): development of the CAN HS network which makes it possible to reach data throughputs of 2 Mb/s.
  Flexray 10 Mb/s: this network is deterministic and can be configured redundantly so as to increase the safety level provided by the physical layer.

The nominal network is used during normal operation of the vehicle. In other words, the nominal network is the network used by default if no breakdown is detected in any of the fixtures on the network. In the example, each of the actuators of the actuation module 40 is linked to the control module via a Flexray link.

Advantageously, each of the actuators is linked to a first gateway 101.2 via a first link 101.1, the first gateway 101.2 being linked to the control module 30 via a second link 101.3.

The backup network is used in particular when a failure in the nominal network is detected. Advantageously, the type of network used for the first network is different from that used for the second network.

This feature makes it possible to avoid modes that are common to both networks. It will be recalled that in engineering a common mode (or common mode failure) refers to a plurality of failures in a system resulting from a single failure.

For example, if the first network is of the Flexray type, the second network may be of the CAN or Ethernet type or even a combination of the two.

Advantageously, each of the actuators is linked to a second gateway 102.2 via a third link 102.1, the gateway 102.2 being linked to the control module 30 via a fourth link 102.3.

The first gateway 101.2 and second gateway 102.2 make it possible to route the data that are exchanged between the fixtures.

If the first network 101 (or the second network 102) is homogeneous, then the first gateway (or the second gateway 102.2 respectively) acts as a router.

By contrast, if the first network (or the second network 102) is non-homogeneous, then the first gateway 101.2 (or the second gateway 102.2 respectively) further makes it possible to convert the packets circulating on the first link 101.1 (or the third link 102.1 respectively) into packets circulating on the third link 101.3 (or the fourth link 102.3 respectively) (and vice versa).

In the types of networks described above, the "babbling idiot" problem is an expression signifying that a terminal is starting to emit arbitrarily, even if a signal is already present on the network, and that it is therefore disturbing or even blocking the network.

This type of problem is generally due to a failure in a network node (a computer, a gateway or any other fixtures connected to the network). This failure may be in hardware, for example a short circuit at the communications port, or in software.

Advantageously, the computers of the actuation module or of the control unit continuously emit on both networks 101, 102.

This feature makes it possible to switch from the first network to the second network easily and rapidly if an error is detected.

Referring to FIG. 3, the method comprises: a step 300 of receiving and processing the data originating from the actuation module 40 via the first network 101.

This step corresponds to normal (or nominal) operation of the driving assistance system. The control module 30 and the actuation module 40 communicate via the first network 101.

The method also comprises a step 301 of detecting a failure on the first network 101. As explained above, the failure is in particular a "babbling idiot" failure, for which the methods of detection are known to a person skilled in the art.

In response to this detection, the method further comprises a step 302 of triggering a phase of manual control recovery of the vehicle by the driver. The duration of the phase of manual control recovery is advantageously between 5 and 10 seconds, for example 10 seconds. If redundancy is no longer being provided, the autonomous mode has to be deactivated while allowing the driver to recover manual control of the vehicle in a safe manner.

The control module 30 indicates to the actuation module 40 that the second network 102 presently has to be used to transfer the data with hot redundancy.

In response to this detection step 301, the method further comprises a step 304 of receiving and processing the data originating from the actuation module via the second network 102. The control module is able to take into account the data originating from the second network 102 and no longer take into account the data originating from the first network 101.

Advantageously, the method for assisting in driving further comprises, in response to detection of a failure in the second network 102, a step of triggering a phase of manual control recovery by the driver of the vehicle via alert means.

As indicated above, if there is a failure on the networks, the autonomous mode has to be deactivated while allowing the driver to recover manual control in a safe manner. The vehicle continues its nominal operation on the second network 102. However, the phase of manual control recovery is triggered. This leads to deactivation of the autonomous mode, either in that the customer recovers manual control or in that the vehicle is stopped on the road if the customer does not recover manual control.

The invention claimed is:

1. A method for assisting in the driving of a vehicle comprising at least one assistance mode, said method being implemented by a control unit of a driver-assistance system, said control unit being connected to an actuation module comprising a plurality of actuators capable of controlling components of the vehicle via a first nominal network and a second backup network, said method comprising a step of:
   Receiving and processing data originating from the actuation module via the first network,
   said method, in response to the detection of a failure in the first network, further comprising steps of:
   Triggering a phase of manual control recovery by the driver of the vehicle, and
   Receiving and processing the data originating from the actuation module via the second network, wherein the second network is a backup network for the first network,
   said method, in response to the detection of a failure in the second network, further comprising steps of:
   Triggering a phase of manual control recovery by the driver of the vehicle, whereby, during this phase of manual control recovery, taking into account, by the control unit, data originating from the first network and does not take into account data originating from the second network.

2. The method for assisting in driving according to claim 1, wherein the detected failure is of the "babbling idiot" type, where a computer connected to the first network emits data onto the first network arbitrarily, in such a way that the functionality of the first network is disturbed or blocked.

3. The method for assisting in driving according to claim 1, wherein the actuation module comprises a plurality of actuators capable of controlling at least one of the following components of the vehicle: direction, acceleration and braking.

4. The method for assisting in driving according to claim 1, wherein the assistance mode provides control both the lateral and longitudinal movement of the vehicle.

5. The method for assisting in driving according to claim 1, wherein the duration of the manual control recovery phase is between 5 and 10 seconds.

6. The method for assisting in driving according to claim 1, wherein the first network comprises a first gateway, the actuation module being linked to the first gateway via a first link, said first gateway being linked to the control unit via a second link.

7. The method for assisting in driving according to claim 1, wherein the second network comprises a second gateway, the actuation module being linked to the second gateway via a third link, said second gateway being linked to the control the control module via a fourth link.

8. A system for assisting in the driving of a vehicle comprising at least one assistance mode, a control unit connected to an actuation module comprising a plurality of actuators capable of controlling components of the vehicle via a first nominal network and a second backup network, said system comprising:

said control unit connected to the plurality of actuators by the first network and by the second network, wherein said control unit is adapted and configured for receiving and processing data originating from the actuation module via the first network, said system further comprising said control unit being adapted and configured for, in response to the detection of a failure in the first network:

Triggering a phase of manual control recovery by the driver of the vehicle, wherein the control unit transmits a command to deactivate a driver-assistance mode, and Receiving and processing the data originating from the actuation module via the second network, wherein the second network is a backup network for the first network, said system further comprising said control unit being adapted and configured for, in response to the detection of a failure in the second network:

Triggering a phase of manual control recovery of the vehicle by the driver, whereby, during this phase of manual control recovery, taking into account, by the control unit, data originating from the first network and does not take into account data originating from the second network.

9. A vehicle comprising the system according to claim 8.

* * * * *